United States Patent
Sakamoto

(10) Patent No.: US 7,802,363 B2
(45) Date of Patent: Sep. 28, 2010

(54) METHOD FOR FORMING A WHEEL BEARING UNIT

(75) Inventor: Junshi Sakamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 264 days.

(21) Appl. No.: 12/013,546

(22) Filed: Jan. 14, 2008

(65) Prior Publication Data

US 2008/0256798 A1    Oct. 23, 2008

Related U.S. Application Data

(62) Division of application No. 10/504,915, filed as application No. PCT/JP03/01944 on Feb. 21, 2003, now abandoned.

(30) Foreign Application Priority Data

Feb. 26, 2002    (JP)    ............... 2002-050158

(51) Int. Cl.
*B23P 17/00*    (2006.01)
(52) U.S. Cl. .................. 29/894.321; 29/894; 29/894.3; 29/894.32; 29/894.322; 301/6.1; 301/6.8; 301/105.1
(58) Field of Classification Search .......... 29/894, 29/894.3, 894.32, 894.321, 894.322; 301/105.1, 301/6.8, 6.1; 384/544, 504, 506, 542, 589; 188/18 A, 18 R, 17

See application file for complete search history.

(56) References Cited

U.S. PATENT DOCUMENTS

| | | | |
|---|---|---|---|
| 6,450,584 B2 | 9/2002 | Brinker et al. | |
| 6,523,909 B1 | 2/2003 | Nakamura et al. | |
| 6,575,637 B1 * | 6/2003 | Tajima et al. | ............... 384/544 |
| 6,626,580 B2 | 9/2003 | Tajima et al. | |
| 6,666,303 B2 | 12/2003 | Torii et al. | |
| 6,672,679 B2 * | 1/2004 | Kaneko | ................... 301/105.1 |
| 6,921,137 B2 | 7/2005 | Morimoto et al. | |
| 6,959,789 B2 | 11/2005 | Torii et al. | |
| 2002/0003071 A1 | 1/2002 | Torii et al. | |

FOREIGN PATENT DOCUMENTS

| | | |
|---|---|---|
| DE | 3012420 | 10/1981 |
| DE | 10044509 A1 | 4/2001 |
| JP | UM 50177/93 | 7/1993 |
| JP | 2001-225605 A | 8/2001 |

OTHER PUBLICATIONS

International Search Report for PCT/JP03/01944 dated Jun. 10, 2003.
International Preliminary Examination Report for PCT/JP001944 dated May 19, 2004.

* cited by examiner

*Primary Examiner*—Rick K Chang
(74) *Attorney, Agent, or Firm*—Crowell & Moring LLP

(57) ABSTRACT

Attachment holes are formed in a plurality of locations in the circumferential direction of the attachment flange of a wheel bearing unit. The amount "h" of projection from an attachment surface in the axial direction of the opening edge peripheral portion of the respective attachment holes is limited under the condition that studs are press-fitted and fixed into the respective attachment holes.

5 Claims, 4 Drawing Sheets

METHOD FOR FORMING A WHEEL BEARING UNIT

CROSS REFERENCE TO RELATED APPLICATIONS

This application is a divisional application of U.S. patent application Ser. No. 10/504,915, filed Nov. 9, 2004, which is a national stage of PCT International Application No. PCT/JP03/01994, filed Feb. 21, 2003, which claims priority under 35 U.S.C. §119 to Japan Patent Application No. 2002-050158 filed Feb. 26, 2002, the entire disclosures of which are herein expressly incorporated by reference.

TECHNICAL FIELD

This invention is related to the improvement of the wheel bearing unit for supporting a wheel or rotor for automobile, or a rotatable member for braking such as a brake drum and so forth.

BACKGROUND OF THE INVENTION

A wheel rim 1 constituting a wheel of an automobile and a rotor 2 constituting a disk brake functioning as a damping device are rotatably supported by a knuckle 3 constituting a suspension device, for example, in the structure as illustrated in FIG. 1 showing a first example of the embodiment of the present invention. That is, an outer race 6 constituting a stationary member which does not rotate even in use and constitutes a wheel bearing unit 5 is fixed by a plurality of connection bolts 7 to the circular supporting hole 4 formed through this knuckle 3. On the other hand, the wheel rim 1 and the rotor 2 are securely connected by a plurality of studs 9 and nuts 10 to a hub 8 constituting a rotary member which rotates in use and constitutes the wheel bearing unit 5.

The outer race 6 is formed respectively with double-row outer raceways 11a and 11b as stationary raceways in the inner peripheral surface thereof and with a connection flange 12 on the intermediate portion of the outer peripheral surface thereof. The outer race 6 in this configuration is fixed to this knuckle 3 by connecting this connection flange 12 to the knuckle 3 with the respective connection bolts 7. On the other hand, an attachment flange 13 is formed on a portion of the outer peripheral surface of the hub 8 extending beyond the outer opening of the outer race 6 (the term "outer" in the axial direction is used to designate the side located outwardly in the width direction of a vehicle in which the unit is assembled, i.e., the left hand side of the respective figures, and conversely the term "inner" in the axial direction is used to designate the side located inwardly in the width direction of a vehicle in which the unit is assembled, i.e., the right hand side of the respective figures).

The wheel rim 1 and the rotor 2 are securely connected to an attachment surface 14 in one side surface (the outer side surface in the illustration) of this attachment flange 13. For this purpose, a number of attachment holes 15 are formed in a plurality of positions arranged in the circumferential direction of the attachment flange 13 and located on the same circle having its center at the central axis of the hub 8 in order to pass through the opposite side surfaces of the attachment flange 13 respectively. Also, each of the respective studs 9 is formed respectively with a serration section 16 in the outer peripheral surface of the base end portion (the right end of FIG. 1) thereof and with a male thread section 17 (refer to FIGS. 2 to 4 to be described below) in the outer peripheral surface of the tip half portion (the left half section of FIG. 1) thereof. Then, the base end portion of each of the respective studs 9 is fixed to the attachment flange 13 by the press-fit insertion of the serration section 16 thereof into the corresponding attachment hole 15 in order to inhibit the rotation of the respective studs 9 relative to this attachment flange 13.

The rotor 2 is arranged to overlap with the attachment surface 14, and furthermore the wheel rim 1 is arranged to overlap with one side surface of this rotor 2. In this condition, the tip portion of the respective studs 9 is inserted through the through holes 18 and 19 opened respectively through the wheel rim 1 and the rotor 2 in order to project from one side surface of the wheel rim 1. Then, the male thread section 17 is threaded into and fastened to the nut 10 at the tip portion of the stud 9 projecting from the one side surface of this wheel rim 1. By this configuration, the wheel rim 1 and the rotor 2 are securely connected to the attachment surface 14 of the attachment flange 13.

Also, the hub 8 is configured by combining a hub body 20 and the inner race 21. Thereamong, the hub body 20 is provided with a first inner raceway 22 as a rotary side raceway which is directly formed on the hub body 20 in the outer peripheral surface of the intermediate portion opposite the outer raceway 11a among the double-row outer raceways 11a and 11b. Furthermore, the inner race 21 is securely fitted onto a small diameter stepped portion 23 formed on the outer peripheral surface of this hub body 20 at the inner end to form the hub 8. Then, a second inner raceway 24 serving also as a rotary side raceway is formed on the outer peripheral surface of this inner race 21 in a location opposite the outer raceway 11b which is the inner one of the double-row outer raceways 11a and 11b. Also, in the case as shown in the figure, this inner race 21 is fixed to the hub body 20 by holding the inner end surface of the inner race 21 with a crimped section 25 formed by plastically deforming the inner end of the hub body 20 outwardly in the radial direction.

Furthermore, a plurality of balls 26 and 26, which are rolling members respectively, are rollingly supported between each of the outer raceways 11a and 11b and the corresponding one of the first and second inner raceways 22 and 24 with retainers 27 and 27 holding these balls. By this configuration, a double-row angular type ball bearing is formed in a back-to-back combination fashion in which the hub 8 is rotatably supported in the inner side of said outer race 6 to receive a radial load and a thrust load. Incidentally, the seal rings 28a and 28b are interposed between each of the opposite ends of the inner peripheral surface of the outer race 6 and the corresponding one of the outer peripheral surface of the intermediate portion of the hub 8 and the outer peripheral surface of the inner end of the inner race 21 in order to isolate the inner space accommodating the respective balls 26 and 26 from the external space. Furthermore, since the wheel bearing unit 5 in the example as illustrated is for use in a driven wheel (the rear wheels of an FR or RR vehicle, the front wheels of an FF vehicle, or all the wheels of a 4WD vehicle), a spline hole 29 is formed in the central location of the hub body 20. And, a spline shaft 31 provided on a constant velocity joint 30 is inserted into this spline hole 29.

When the wheel rolling bearing unit 5 as described above is used, as illustrated in FIG. 1, the outer race 6 is fixed to the knuckle 3 while the wheel rim 1 supporting a tire (not shown in the figure) and the rotor 2 as a rotatable member for braking are fixed to the attachment flange 13 of the hub 8. Among them, the rotor 2 is combined with a support and a caliper fixed to the knuckle 3 (not shown in the figure) to form a disk brake for braking. During a braking operation, a pair of pads located with the rotor 2 placed between them is urged against the opposite side surfaces of this rotor 2 which are braking friction surfaces. In the description herein, the term "braking friction surface" is intended to mean, in the case where the rotatable member for braking is a rotor, the opposite side surfaces in the axial direction of this rotor and, in the case where the rotatable member for braking is a drum, the inner peripheral surface of this drum.

Meanwhile, it is known that a vibration with unpleasant noise, as referred to as judder, often occurs during automotive braking. While several causes are known as the causes of such a vibration, for example, the nonuniform friction state between the side surface of the rotor 2 and the lining of the pads, the runout of the rotor 2 is known as a major cause. Namely, while the side surface of this rotor 2 has ideally to be assembled normal to the center of rotation of this rotor 2, it is difficult to perfectly realize the normal orientation due to manufacturing error which is inevitable. As a result, when driving an automobile, the runout of the side surface of the rotor 2 can not be avoided, although being more or less, in the direction of the rotatable shaft (in the right and left direction in FIG. 1).

If such a runout (the amount of displacement in the right and left direction in FIG. 1) increases, the above judder occurs when the lining of the pair of pads is urged for braking against the opposite side surfaces of the rotor 2. Also, in the case where the drum constituting a drum brake is fixed to the side surface of the attachment flange 13, a vibration such as judder occurs when a shoe is urged against this inner peripheral surface of the drum unless the inner peripheral surface of this drum is perfectly in parallel with the center of rotation of the drum. In order to inhibit the judder as generated by such a cause, it is important to suppress (or prevent) the runout (axial runout) of the side surface of the rotor 2 in the axial direction or to suppress (or prevent) the runout of the inner peripheral surface of the drum in the radial direction.

However, in the case of a conventional wheel bearing unit, for the following reasons, there is the possibility that the runout of the braking friction surface (the side surface of the rotor 2 or the inner peripheral surface of the drum) becomes likely.

At first, in the case of the so-called third-generation wheel bearing unit 5 as illustrated in FIG. 1 in which the first inner raceway 22 is formed directly in the outer peripheral surface of the intermediate portion of the hub 8, it becomes difficult to secure the parallelism of the first and second inner raceways 22 and 24. Namely, in the case of the so-called second-generation wheel bearing unit in which a pair of inner races are securely fitted onto the hub body, the outer peripheral surface of the small diameter stepped portion, long in width, formed on the hub body for externally fitting and fixing the pair of inner races thereto is a single cylindrical surface whose diameter is limited to not changed over the almost entire length of the portion onto which both the inner races are securely fitted. It is relatively easy to machine such a single cylindrical surface, and therefore when the first and second inner raceways are provided on the outer peripheral surface of the hub by fitting and fixing the pair of inner races having the same diameter onto the small diameter stepped portion, the parallelism of the two inner raceways can be easily secured with reference to rotation center as long as the precision of the pair of inner races can be secured.

Contrary to this, in the case of the third-generation wheel bearing unit, there is formed a step between the portion of the axially intermediate portion of the hub body 20 in which the first inner raceway 22 is formed, and the small diameter stepped portion 23 for externally fitting and fixing the inner race 21 for providing the second inner raceway 24. Accordingly, as compared with the second-generation wheel bearing unit, there is the possibility that the braking friction surface of the rotatable member for braking is subject to runout due to the degradation of the parallelism of the first and second inner raceways 22 and 24.

Also, in the case as shown in FIG. 1 in which the inner race 21 is fixed to the hub body 20 by holding the inner end surface of the inner race 21 with the crimped section 25 formed by plastically deforming the inner end of the hub body 20 outwardly in the radial direction, there is the possibility that the attachment flange 13 is slightly deformed when this crimped section 25 is formed depending upon the fixation method of this hub body 20. Namely, when the crimped section 25 is formed, a large load is applied to the inner end of the hub body 20 in order to plastically deform this inner end with the attachment flange 13 being supportingly fixed. Because of this, on the basis of this load, there is the possibility that the attachment surface 14 provided in one side surface of the attachment flange 13 is slightly deformed and that the braking friction surface of the rotatable member for braking which is overlappingly fixed to this attachment surface 14 is subject to runout.

Furthermore, in the case of the structure as illustrated in FIG. 1, the plurality of the studs 9 for supporting the rotatable member for braking are press-fitted and fixed into the respective attachment holes 15 formed in the attachment flange 13. Because of this, during the press-fit insertion, there is the possibility that the opening edge peripheral portion of the respective attachment holes 15 which is a portion of the attachment surface 14 (the circular ring portion within 2.5 mm outwardly in the radial direction from the periphery of the opening of the respective attachment holes 15) is slightly projected in the direction to form the convex portion as viewed from the attachment surface 14 by virtue of the engagement of the inner peripheral surface of this attachment hole 15 with the serration section 16 of the stud 9. Particularly, if the amount of deformation of the opening edge peripheral portion 15 varies from one to another of the respective attachment hole 15, it is undesirable because the braking friction surface of the rotatable member for braking overlappingly connected and fixed to the attachment surface 14 is subject to runout.

In the case where the first inner raceway 22 is directly formed on the hub body 20 with the crimped section 25 formed at the inner end of this hub body 20, the braking friction surface of the rotatable member for braking is subject to runout, and therefore it is particularly important to inhibit the runout of the braking friction surface due to the press-fit insertion of the stud 9 as described above.

Taking into consideration the above circumstances, the wheel bearing unit in accordance with the present invention has been made in order to realize the structure for inhibiting the runout of the braking friction surface due to the press-fit insertion of studs and preventing the occurrence of judder due to the runout of this braking friction surface.

DISCLOSURE OF THE INVENTION

In accordance with one aspect of the present invention, a wheel bearing unit comprises: a stationary member which is provided with a stationary raceway and does not rotate even in use; a rotary member which is provided with a rotary raceway and rotates in use; an attachment flange provided on the outer peripheral surface of this rotary member; a plurality of attachment holes formed through this attachment flange in the axial direction; a plurality of studs fixed to the attachment flange by press-fit-inserting the base end portions thereof into the respective attachment holes; and a plurality of rolling members provided between the stationary raceway and the rotary raceway, the wheel bearing unit is characterized in that a rotatable member for braking is overlappingly connected and fixed to an attachment surface provided in one side surface of the attachment flange by the respective studs and nuts into which the respective studs are threaded, and that the amount of projection, from the attachment surface in the axial direction, of the opening edge peripheral portion of the respective attachment holes which is a portion of the attachment surface is limited to no larger than 10 μm under the condition that the respective studs are press-fitted and fixed to the respective attachment holes.

In accordance with another aspect, the wheel bearing unit of the present invention comprises: a stationary member which is provided with a plurality of stationary raceways and does not rotate even in use; a rotary member which is provided with a plurality of rotary raceways and rotates in use; an attachment flange provided on the outer peripheral surface of this rotary member; a plurality of attachment holes formed through this attachment flange in the axial direction; a plurality of studs fixed to the attachment flange by press-fit-inserting the base end portions thereof into the respective attachment holes; and a plurality of rolling members provided between each of the respective stationary raceway and a corresponding one of the respective rotary raceway.

Also, one member of the above stationary member and the above rotary member inwardly located in the radial direction is provided with a first inner raceway which is the stationary raceway or the rotary raceway directly formed in an axially intermediate portion of the outer peripheral surface, a small diameter stepped portion formed at one end portion in the axial direction of the outer peripheral surface, and an inner race securely fitted onto this small diameter stepped portion. Furthermore, this inner race is formed with a second inner raceway which is the stationary raceway or the rotary raceway formed in the outer peripheral surface thereof and held at one end surface thereof by a crimped section which is formed by outwardly plastically deforming the above one member in the radial direction.

Still further, a rotatable member for braking is overlappingly connected and fixed to an attachment surface provided in one side surface of the attachment flange by the respective studs and nuts into which the respective studs are threaded.

Particularly, in the case of the wheel bearing unit in accordance with the present invention, the amount of projection, from the attachment surface in the axial direction, of the opening edge peripheral portion of the respective attachment holes which is a portion of the attachment surface (the circular ring portion within 2.5 mm outwardly in the radial direction from the periphery of the opening of the respective attachment holes) is limited to no larger than 10 μm under the condition that the respective studs are press-fitted and fixed into the respective attachment holes.

In accordance with the wheel bearing unit of the present invention configured as described above, it is possible to inhibit judder during a braking operation. That is, since the amount of projection of the opening edge peripheral portion of the respective attachment holes on the basis of the engagement between the inner peripheral surface of the respective attachment holes and the outer peripheral surface of the respective studs by the press-fit insertion of the respective studs is limited to no larger than 10 μm, it becomes easy to inhibit the runout of the braking friction surface of the rotatable member for braking, which is overlappingly fixed to the attachment surface of the attachment flange, to inhibit the generation of judder. Particularly, even if the amount of projection of the respective opening edge peripheral portions varies from one to another of the respective attachment holes, the differential amount of projection between the attachment holes is limited to no larger than 10 μm, and therefore it is easy to inhibit the runout of the braking friction surface of the rotatable member for braking due to the differential amount of projection. Incidentally, if the amount of projection exceeds 10 μm, it becomes likely that the runout of the braking friction surface of the above rotatable member for braking increases to generate the judder on the basis of the projection of the opening edge peripheral portion or of the differential amount of projection between the respective opening edge peripheral portions due to the press-fit insertion of the respective studs.

The following table shows the result of the experiment conducted with the wheel bearing unit as illustrated in FIG. 1 for the purpose of investigating the relationship between the generation of judder and the amount of projection of the opening edge peripheral portions from the attachment surface.

TABLE 1

| Amount of Projection | Evaluation of Judder |
| --- | --- |
| 50 | x |
| 30 | x |
| 20 | x |
| 15 | x |
| 10 | ○ |
| 8 | ⊚ |
| 5 | ⊚ |

Incidentally, in the table 1, "⊚" indicates substantially no generation of judder; "○" indicates the generation of only problem-free judder; and "x" indicates the generation of problematic judder respectively. As apparent from this table 1, the generation of judder can be inhibited by limiting the amount of projection, from the attachment surface in the axial direction, of the opening edge peripheral portion of the respective attachment hole up to 10 μm under the condition that the studs are press-fitted and fixed into the respective attachment holes.

BEST MODE FOR CARRYING OUT THE INVENTION

Figure 1:
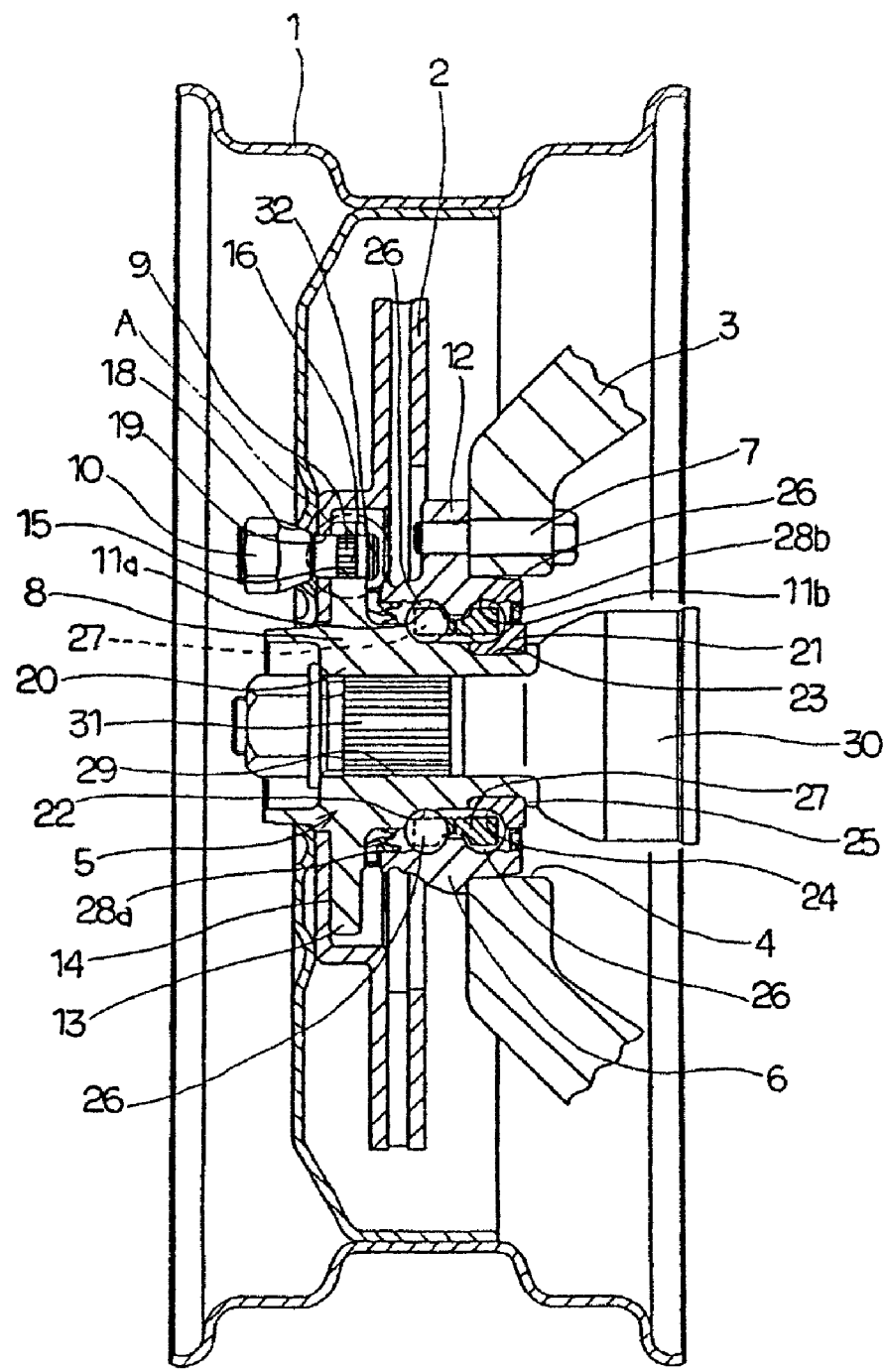
FIG. 1 is a cross sectional view to show a first example of the embodiment of this invention.
Figure 2:
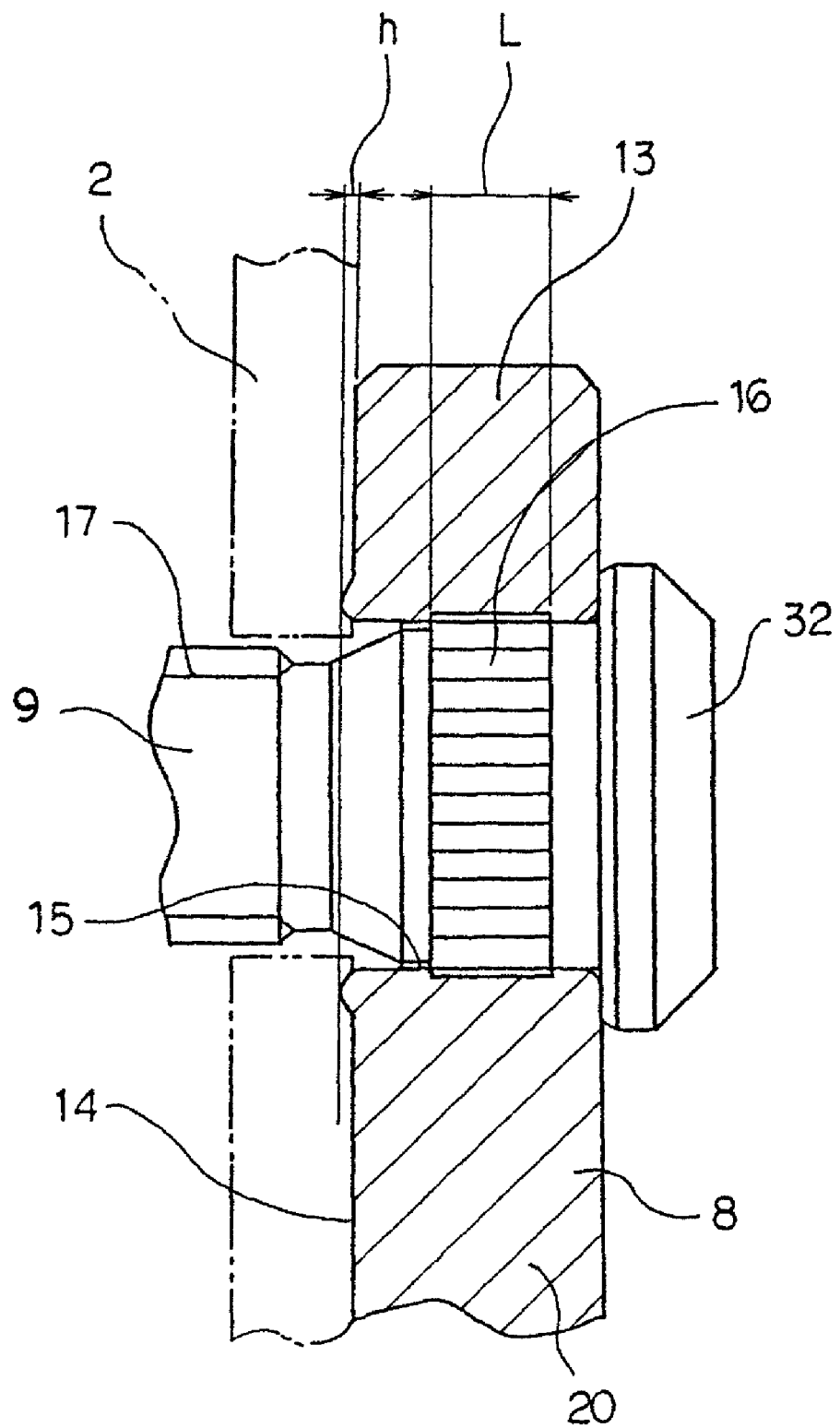
FIG. 2 is an enlarged cross sectional view to show in an exaggerating manner the condition that the opening edge peripheral portion of this attachment holes deforms with the stud pressed into the attached hole, corresponding to portion A of FIG. 1.

FIGS. 1 and 2 show a first example of the embodiment of the present invention. A feature of the invention is that the runout of the rotor 2, which is a rotatable member for braking securely connected to the attachment surface 14, is inhibited by sufficiently securing the surface precision of the attachment surface 14 which is one side surface of the attachment flange 13 formed on the outer peripheral surface of the hub 8 for serving as a rotary member. The other basic structures and the functionality of the wheel bearing unit 5 are similar to those as described with reference to FIG. 1 in the section of the above background art, redundant explanation will be omitted or simplified, and the following description is focused on the characteristic structures of the present invention.

The outer peripheral surface of the hub body 20 constituting the hub 8 is provided with the attachment flange 13 for fixing the wheel rim 1 constituting a wheel and the rotor 2 as a rotatable member for braking. The attachment holes 15 are formed in a plurality of positions arranged in the circumferential direction of this attachment flange 13 and located on the same circle having its center at the central axis of the hub 8 while the base end portions of the studs 9 are press-fitted and fixed to the respective attachment holes. Each of the respective studs 9 is formed respectively with a brim portion 32 at the base end, the serration section 16 in the outer peripheral surface near the base end portion and the male thread section 17 around the tip half portion for fixing a nut 10.

Particularly, in the case of this example, the amount "h" of projection (refer to FIG. 2 as described below), from an attachment surface 14 in the axial direction, of the opening edge peripheral portion of the respective attachment holes 15 (the circular ring portion from the periphery of the opening of the respective attachment holes 15 to a thickness of 2.5 mm outwardly in the radial direction) which is a portion of the attachment surface 14 is limited to no larger than 10 μm under the condition that studs are press-fitted and fixed into the respective attachment holes 15. Namely, as illustrated and exaggerated in FIG. 2, the amount "h" of projection of the opening edge peripheral portion of the respective attachment hole 15 is restricted to no larger than 10 μm (h≦10 μm) even if the opening edge peripheral portion of the respective attachment holes 15 is projected from the attachment surface 14 on the basis of the engagement between the outer peripheral surface of the serration section 16 of the studs 9 and the inner peripheral surface of the attachment holes 15 as a result of the press-fit insertion of the stud 9.

In order to assure the amount "h" of projection to be no larger than 10 μm, it is required to decrease, as small as possible, the interference between the outer peripheral surface of this stud 9 and the inner peripheral surface of the attachment hole 15, the dimensional tolerances of these peripheral surfaces and the axial length of the engaging portion between these peripheral surfaces to the extent that the connection strength of this stud 9 can be secured (i.e., the extent that the stud 9 shall not wobble in use). Also, it is desirable to locate the engaging portion in an axial position as remote as possible from the attachment surface 14 in the axial direction. More specifically speaking, when the studs 9 are press-fitted and fixed to the attachment holes 15 with the serration sections 16 formed on the studs 9 as in the case of this example, it is desirable to decrease, as small as possible, the interference between the outer peripheral surface of this serration sections 16 and the inner peripheral surface of the attachment hole 15, the dimensional tolerances of these peripheral surfaces and the axial length L of the serration sections 16 to the extent that the connection strength of the studs 9 can be secured. Also, preferably, the serration section 16 is formed in a location of the outer peripheral surface of the stud 9 close to the brim portion 32.

In accordance with the wheel bearing unit of this example as described above, the amount "h" of projection, from an attachment surface 14 in the axial direction, of the opening edge peripheral portion of the respective attachment holes 15 of the attachment flange 13 is limited to no larger than 10 μm under the condition that the studs 9 are press-fitted and fixed to the respective attachment holes 15, and therefore it is possible to inhibit the generation of judder. That is, since the amount of projection of the opening edge peripheral portion of the respective attachment holes 15 on the basis of the engagement between the inner peripheral surface of the respective attachment holes 15 and the outer peripheral surface of the respective studs 9 by the press-fit insertion of the studs 9 is limited to no larger than 10 μm, it becomes easy to inhibit the runout of the braking friction surface (the side surface of the rotor 2 or the inner peripheral surface of the drum) of the above rotatable member for braking, which is overlappingly fixed to the attachment surface of the attachment flange, to inhibit the generation of judder. Particularly, even if the amount "h" of projection of the respective opening edge peripheral portions varies from one to another of the respective attachment holes 15, the difference of the amount "h" of projection between the attachment holes 15 is limited to no larger than 10 μm, and therefore it is easy to inhibit the runout of the braking friction surface of the rotatable member for braking due to the difference of the amount "h" of projection. Incidentally, if the amount of projection "h" exceeds 10 μm, it becomes likely that the runout of the braking friction surface of the rotatable member for braking increases to generate the judder on the basis of the projection "h" of the opening edge peripheral portion or of the difference of the amount "h" of projection between the respective opening edge peripheral portions due to the press-fit insertion of the respective stud 9.

Incidentally, while the studs 9 are press-fitted and fixed into the attachment holes 15 by engaging the outer peripheral surface of the serration sections 16 formed on the studs 9 with the attachment hole 15 in the case of this example, the structure is not limited thereto. For example, the stud and the attachment hole can be press-fitted and fixed to each other only by interference fit, or alternatively by designing this attachment hole in a noncircular profile and the portion of the outer peripheral surface of the stud also in a noncircular profile for engaging the inner peripheral surface of this attachment hole, and engaging these noncircular portions by interference fit according to press-fit insertion. In brief, the present invention is applicable to any structure as long as the stud can be press-fitted and fixed into the attachment hole in order to prevent them from co-rotating during nut-clamping.

Figure 3:
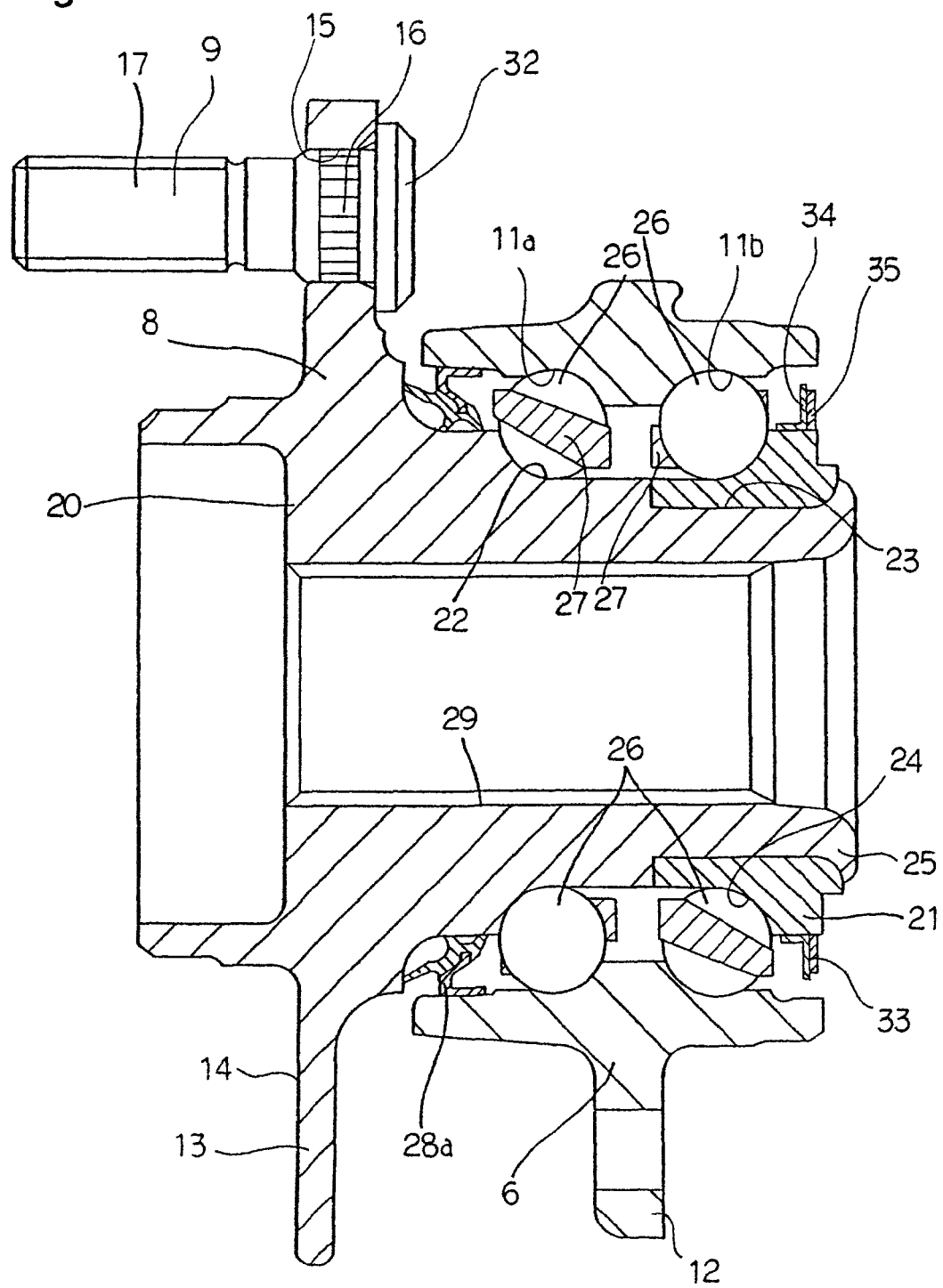
FIG. 3 is a cross sectional view to show a second example of the embodiment of this invention.

Next, FIG. 3 shows a second example of the embodiment of the present invention. While the seal ring 28b (FIG. 1) is interposed between the inner end of the inner peripheral surface of the outer race 6 and the inner end of the outer peripheral surface of the inner race 21 in the case of the first example as described above, an encoder 33 serving as a rotational speed detection device is provided between the inner end of the inner peripheral surface of the outer race 6 and the inner end of the outer peripheral surface of the inner race 21 in the case of the present example. Namely, in the case of the present example, the encoder 33 is securely fitted onto the inner end of the outer peripheral surface of the inner race 21 by interference fit. This encoder 33 is installed by applying an encoder main body 35, which is a rubber magnet mixed with a ferrite powder, a rare earth magnet powder or the like, onto the side surface of a metal core 34 having an L-shaped cross section around the entire circumference. This encoder main body 35 is magnetized in the axial direction while the sense of magnetization is alternately inverted at even intervals in the circumferential direction. Accordingly, S poles and N poles are alternately and with a uniform interval arranged in the inner surface of the encoder 33 in the circumferential direction.

Then, when the S poles and the N poles constituting this encoder main body 35 are alternately passed through the vicinity of the detection surface of a rotation detecting sensor (not shown in the figure) but arranged opposite this encoder main body 35 with a small gap therebetween, the magnetic flux density in the above rotation detecting sensor varies to induce the variation of the output of this rotation detecting sensor. The frequency of the variation of this output is proportional to the rotational speed of the wheel, and therefore the anti lock brake system (ABS) and the traction control system (TCS) can be appropriately controlled by outputting this output signal to a controller (not shown in the figure). The structures and the functionality of the other elements are similar to those of the first example as described above.

Figure 4:
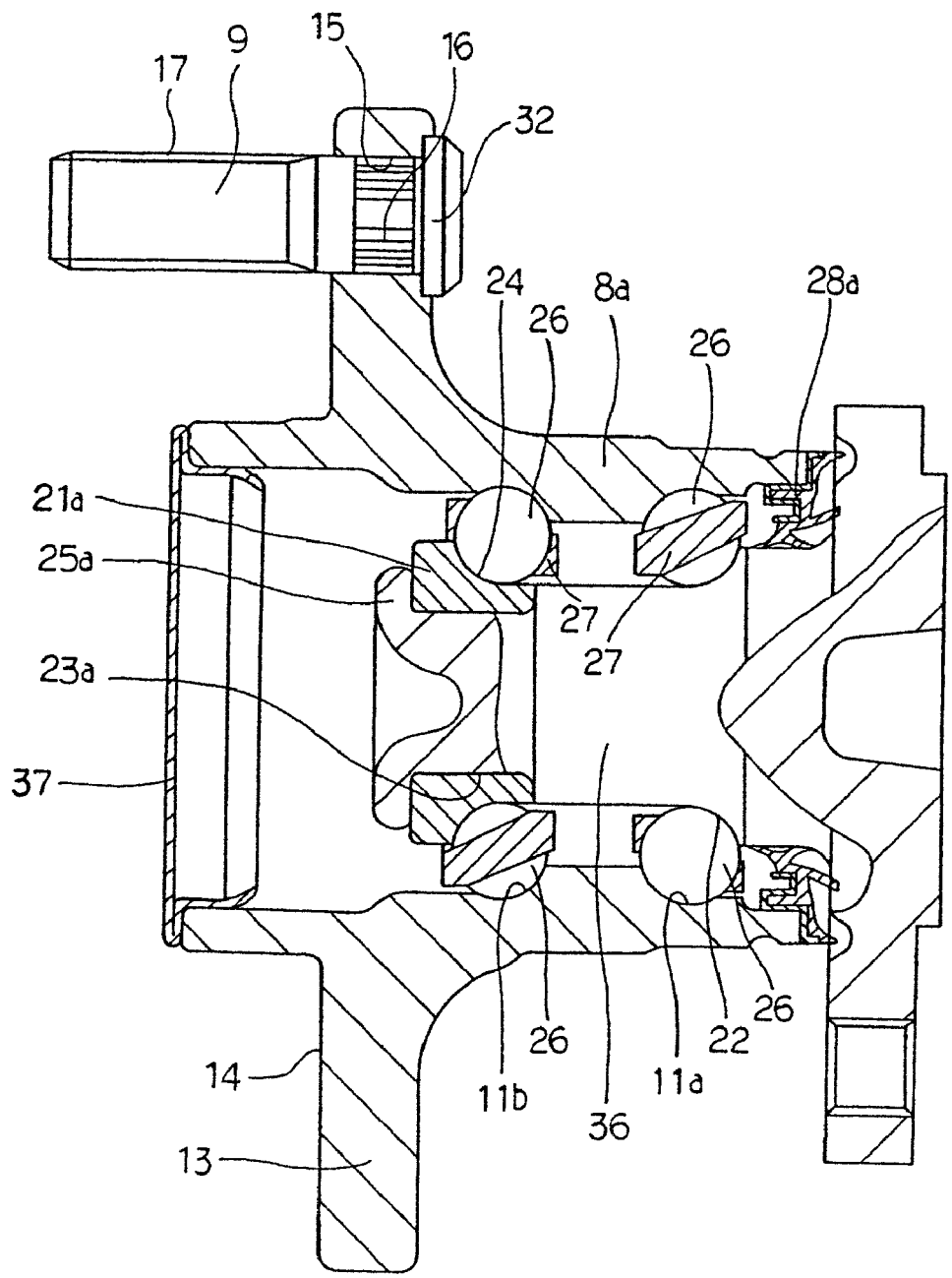
FIG. 4 is a cross sectional view to show a third example of the embodiment of this invention.

FIG. 4 shows a third example of the embodiment in accordance with the present invention. In the structures of the first example and the second example as described above for supporting a driven wheel (the rear wheels of an FR or RR vehicle, the front wheels of an FF vehicle, or all the wheels of a 4WD vehicle), the outer race 6 is provided to constitute the stationary member which does not rotate even in use while the hub 8 constituting the rotary member, which rotates in use, is located inside this outer race 6 in the radial direction. Contrary to this, the structure in accordance with this example serves to support a non-driven wheel (the front wheels of an FR or RR vehicle, or the rear wheels of an FF vehicle) while the stationary member comprises a support shaft 36 located in a radially inside position, and the rotary member comprises a hub 8a located outside this support shaft 36 in the radial direction. Namely, in the case of this example, first and second inner raceways 22 and 24, which are stationary raceways respectively, are provided on the support shaft 36 which is securely connectable to the end portion of an axle (not shown in the figure) constituting a suspension device. Thereamong, the first inner raceway 22 is directly formed in the outer peripheral surface of the intermediate portion of the support shaft 36. Also, at the same time, an inner race 21a is formed with the second inner raceway 24 in the outer peripheral surface and securely fitted onto a small diameter stepped portion 23a, which is formed in the outer peripheral surface of this support shaft 36 at the outer end. Then, the inner race 21a is held at the outer end surface thereof by a crimped section 25a which is formed by outwardly plastically deforming the outer end portion of the support shaft 36.

On the other hand, the hub 8a comprising the rotary member is provided outside the support shaft 36 in the radial direction. This hub 8a is formed with double-row outer raceways 11a and 11b, which are rotary raceways respectively, in the inner peripheral surface and an attachment flange 13 in the outer peripheral surface respectively. The wheel rim 1 constituting the wheel is securely connected to the attachment surface 14 of the attachment flange 13, as well as the rotor 2 (refer to FIG. 1) constituting a damping device, by studs 9 press-fitted and fixed to respective attachment holes 15 in this attachment flange 13 and by nuts 10 (refer to FIG. 1) into which the studs 9 are threaded. Furthermore, a plurality of balls 26 and 26, which are rolling members respectively, are rollingly supported between each of the outer raceways 11a and 11b and the corresponding one of the first and second inner raceways 22 and 24 with retainers 27 and 27 for holding these balls. Also, the opening of the hub 8a is closed by a cap 37 at the outer end in order to prevent foreign objects from entering the space accommodating the respective balls 26 and 26. The structures and the functionality of the other elements are similar to those of the first and second examples as described above.

INDUSTRIAL APPLICABILITY

Since the wheel bearing unit in accordance with the present invention is constructed and operated as mentioned above, it is possible to sufficiently inhibit unpleasant noise and vibration during automotive braking.

What is claimed is:

1. A method for forming a wheel bearing unit, comprising the steps of:
   forming a plurality of attachment holes in an axial direction through an attachment flange provided on an outer peripheral surface of a rotary member that is provided with a plurality of rotary raceways and rotates in use;
   fixing a plurality of studs to the attachment flange by press-fit inserting a base end portion thereof into the respective attachment holes; and
   disposing a plurality of rolling members between a plurality of stationary raceways, that are provided with a stationary member that does not rotate even in use, and the plurality of rotary raceways,
   wherein one member of the stationary member and the rotary member inwardly located in a radial direction is provided with a first inner raceway which is the stationary raceway or the rotary raceway directly formed in an axially intermediate portion of the outer peripheral surface, a small diameter stepped portion formed at one end portion in the axial direction of the outer peripheral surface, and an inner race securely fitted onto the small diameter stepped portion, and the inner race is formed with a second inner raceway which is the stationary raceway or the rotary raceway formed in the outer peripheral surface thereof and held at one end surface thereof by a crimped section which is formed by outwardly plastically deforming the one member in the radial direction,
   wherein, in use, a rotatable member for braking is overlappingly connected and fixed to an attachment surface provided in one side surface of the attachment flange by the respective studs and nuts into which the respective studs are threaded,
   wherein an opening edge peripheral portion of the respective attachment holes which is a part of the attachment surface is projected in the axial direction due to the press-fit insertion of the studs into the respective attachment holes, and
   wherein the amount of projection, from the attachment surface in the axial direction, of the opening edge peripheral portion is limited to no larger than 8 μm under the condition that the respective studs are press-fitted and fixed into the respective attachment holes.

2. The method as claimed in claim 1, wherein the opening edge peripheral portion of the respective attachment holes is a portion within 2.5 mm outwardly in the radial direction from the opening edge of the respective attachment holes.

3. A method for forming a wheel bearing unit, comprising the steps of:
   forming a plurality of attachment holes in an axial direction through an attachment flange provided on an outer peripheral surface of a rotary member that is provided with a plurality of rotary raceways and rotates in use;
   fixing a plurality of studs to the attachment flange by press-fit inserting a base end portion thereof into the respective attachment holes; and disposing a plurality of rolling members between a plurality of stationary raceways, that are provided with a stationary member that does not rotate even in use, and the plurality of rotary raceways, wherein one member of the stationary member and the rotary member inwardly located in a radial direction is provided with a first inner raceway which is the stationary raceway or the rotary raceway directly formed in an axially intermediate portion of the outer peripheral surface, a small diameter stepped portion formed at one end portion in the axial direction of the outer peripheral surface, and an inner race securely fitted onto the small diameter stepped portion, and the inner race is formed with a second inner raceway which is the stationary raceway or the rotary raceway formed in the outer peripheral surface thereof and held at one end surface thereof by a crimped section which is formed by outwardly plastically deforming the one member in the radial direction, wherein, in use, a rotatable member for braking is overlapping connected and fixed to an attachment surface provided in one side surface of the attachment flange by the respective studs and nuts into which the respective studs are threaded, wherein an opening edge peripheral portion of the respective attachment holes which is a part of the attachment surface is projected in the axial direction due to the press-fit insertion of the studs into the respective attachment holes, and wherein the amount of projection, from the attachment surface in the axial direction, of the opening edge peripheral portion, caused by, or due to, material flow from press-fitting and fixing of the respective studs into the respective attachment holes, is limited to no larger than 8 μm.

4. The method as claimed in claim 1, wherein the amount of projection is limited to between 5 μm and 8 μm.

5. The method as claimed in claim 3, wherein the amount of projection is limited to between 5 μm and 8 μm.

* * * * *